(12) United States Patent
Steckhan

(10) Patent No.: US 6,823,770 B2
(45) Date of Patent: Nov. 30, 2004

(54) COFFEE BEAN CONTAINER FOR AUTOMATIC COFFEE MAKER

(75) Inventor: Markus Steckhan, Mulheim (DE)

(73) Assignee: Wik Far East Ltd., Northpoint (HK)

( * ) Notice: Subject to any disclaimer, the term of this patent is extended or adjusted under 35 U.S.C. 154(b) by 0 days.

(21) Appl. No.: 10/763,022

(22) Filed: Jan. 22, 2004

(65) Prior Publication Data

US 2004/0173101 A1 Sep. 9, 2004

(30) Foreign Application Priority Data

Jan. 22, 2003 (DE) .......................................... 203 00 928

(51) Int. Cl.[7] .......................... A47J 31/06; A47J 31/40; A47J 31/42; A47J 31/46; A47J 42/00
(52) U.S. Cl. .......................... 99/286; 99/287; 99/289 R; 99/510
(58) Field of Search ........................... 99/348, 352–355, 99/509, 510, 286, 287, 289 R, 300–307, 310, 313, 298, 280; 241/101.2, 100, 152.2, 261.2, 259.1, 285.2

(56) References Cited

U.S. PATENT DOCUMENTS

| | | | | |
|---|---|---|---|---|
| 1,189,035 A | * | 6/1916 | Asbury et al. ............... | 241/100 |
| 3,327,615 A | * | 6/1967 | Swan ........................... | 99/286 |
| 4,007,675 A | * | 2/1977 | Cailliot et al. ................ | 99/286 |
| 4,555,984 A | * | 12/1985 | Yamashita ................... | 99/286 |
| 4,624,177 A | * | 11/1986 | Ito et al. ....................... | 99/286 |
| 5,058,814 A | * | 10/1991 | Ephraim et al. ......... | 241/152.2 |
| 5,186,399 A | * | 2/1993 | Knepler et al. ............... | 241/34 |
| 5,307,733 A | * | 5/1994 | Enomoto ...................... | 99/280 |
| 5,417,145 A | * | 5/1995 | Joseph et al. ................. | 99/280 |
| 5,913,961 A | * | 6/1999 | Chmiel et al. ................ | 99/286 |
| 6,227,102 B1 | * | 5/2001 | Sham et al. .................. | 99/286 |
| 6,339,985 B1 | * | 1/2002 | Whitney ....................... | 99/286 |
| 6,708,599 B2 | * | 3/2004 | Torigai et al. ................ | 99/286 |
| 2002/0145010 A1 | | 10/2002 | Ufheil et al. | |

FOREIGN PATENT DOCUMENTS

| | | |
|---|---|---|
| DE | 202 12 880 U1 | 7/2002 |
| DK | 280452 | 11/1927 |
| EP | 1068 826 A2 | 1/2001 |
| EP | 04001044.9-2313 | 4/2004 |

* cited by examiner

Primary Examiner—Timothy F. Simone
(74) Attorney, Agent, or Firm—Margaret Polson; Patent Law Office of Rick Martin, P.C.

(57) ABSTRACT

A coffee bean container for an automatic coffee maker comprising a receptacle (2) for storing coffee beans, with an output shaft (4) via which coffee beans in the receptacle (2) can be supplied to a grinding mill. The coffee bean container has a coupling ring (7) disposed coaxially to the output shaft (4) for connecting the coffee bean container (1) to an automatic coffee maker. The coffee bean container (1) has a closure unit (12) for closing the output shaft (4) which has at least one closure element (13, 14). The at least one closure element (13, 14) is supported about a pivot axis parallel to the axis of the output shaft (4) and pivotable between an open and a closed position. The closure unit (12) includes a mechanical drive which mechanically couples the closure element(s) (13, 14) to a rotational movement of the receptacle (2) which moves the closure element(s) to the open position or closed position.

10 Claims, 2 Drawing Sheets

COFFEE BEAN CONTAINER FOR AUTOMATIC COFFEE MAKER

The coffee bean container is fastened on the housing of the automatic coffee maker by a coupling ring, which can be secured in place on a correspondingly shaped counterpiece, for example in the manner of a bayonet type lock.

Removing the coffee bean container from the automatic coffee maker is only possible when the container is empty. Otherwise the coffee beans contained in the coffee bean container would fall out through the output shaft. The removal of the coffee bean container may be necessary to have access to the grinding mill, for example to clean either the mill or to clean the coffee bean container itself. However, the coffee beans falling out of the coffee bean container when the container is removed is perceived as disadvantageous.

Building on the discussed prior art, the invention therefore addresses the problem of providing a coffee bean container for an automatic coffee maker which can be removed from an automatic coffee maker without the coffee beans falling out of the coffee bean maker, even when filled with coffee beans.

The invention solves the problem of closing the output shaft by having a closure unit comprising at least one closure element associated with the coffee bean container. The closure element is supported pivotably between the open and closed positions about a pivot axis disposed parallel to the axis of the output shaft. The closure unit has a mechanical drive, through which the at least one closure element, coupled mechanically to a rotational movement of the receptacle, can be pivoted from its open position into its closed position or conversely.

SUMMARY OF THE INVENTION

The primary aspect of the present invention is to provide a coffee bean container for an automatic coffee machine which allows the user remove the container from the automatic coffee machine without first empting the container of coffee beans.

Other aspects of this invention will appear from the following description and appended claims, reference being made to the accompanying drawings forming a part of this specification wherein like reference characters designate corresponding parts in the several views.

This coffee bean container includes a closure unit with one or several closure elements which are automatically brought into their closed position with a removal of the coffee bean container from the automatic coffee maker. The necessary rotational movement for detaching the coupling ring from its counterpiece and removing the coffee bean container is utilized for this automatic closure of the container. The closure element(s) is pivotably supported about an axis parallel to the axis of the output shaft and can be pivoted into the output shaft into either the closed position or the open position.

The at least one closure element is mechanically driven. A connecting link drive for converting the rotational movement of the receptacle into a pivotal movement of the closure element(s) is preferred. Such a connecting link drive can be realized through a cam peg which engages a cam groove on the closure element(s). In one embodiment each closure element carries a cam peg, which engages a cam groove. Depending on if the closure element(s) is supported on the coupling ring or on the receptacle, the cam groove can be associated with the particular other element. It is also possible to provide a cam disk with a number of grooves corresponding to the number of closure elements.

In principle, the desired pivot movement coupled to a rotational movement of the receptacle of the closure element (s) can be done such that the closure element(s) is supported on the receptacle. In such a case the cam groove is stationary relative to a rotational movement of the receptacle and corresponding to the closure element about the axis of the output shaft. The closure unit can also be conceptualized such that the element supporting at least one radial cam is coupled to the rotational movement of the receptacle.

A further development is to mount the coupling ring rotatably relative to the receptacle between at least two positions. One end stop to limit the rotational movement of the receptacle relative to the coupling ring represents the open position of the closure element(s). The other end position corresponds to the closed position of the closure element(s). This ensures any rotational movement to detach the coupling ring from its counterpiece on the automatic coffee maker is only possible when the closure unit closes the output shaft of the receptacle, since a torque transfer from the receptacle onto the coupling ring for detaching the same from its counterpiece is only possible if the closure element(s) is located in the closed position such that it blocks the output shaft.

The closure unit can comprise two closure elements. In principle it is feasible to leave a residual opening, whose inner width, however, is smaller than the smallest diameter of an average coffee bean.

Exchanging the coffee beans contained in such a container for another variety is readily possible with the present invention. By having an automatic coffee maker with several coffee bean containers filled with different bean varieties, the containers can easily be exchanged. Or the single coffee bean container can be removed, emptied and re-filed with a different type of bean.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
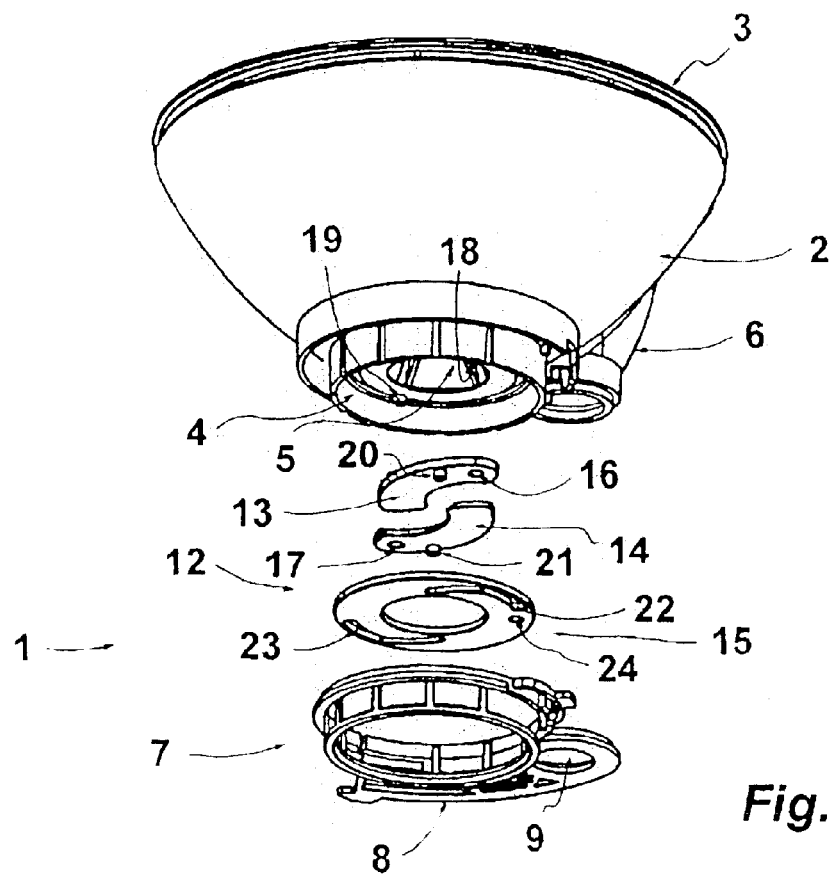
FIG. 1 is an exploded, perspective view of a coffee bean container for an automatic coffee maker.

As shown in FIG. 1, a coffee bean container 1 has a receptacle 2 for storing coffee beans. The receptacle 2 has a cover 3 for closing the receptacle 2 at the top. The lower side the receptacle 2 includes an output shaft 4, via which the coffee beans located in the receptacle 2 can be supplied to a grinding mill (not shown). The output shaft 4 is delimited at the top by a guide element 5, also shown in FIG. 2, which is braced via feet on the inner wall of receptacle 2. Formed onto the receptacle 2 is a ground coffee shaft 6, by which already ground coffee can be supplied to an automatic coffee maker, bypassing the grinding mill. The cover 3 also covers the ground coffee shaft 6 at the top.

Coffee bean container 1 has a coupling ring 7, with which the coffee bean container 1 can be connected to an automatic coffee maker, not shown in the Figures. The coupling ring 7 in the depicted embodiment example is connected torsion-tight to the receptacle 2. Formed onto the coupling ring 7 is an extension 8 with an opening 9. The opening 9 is flush with the lower output of the ground coffee shaft 6. A ground coffee supply opening of the automatic coffee maker can be closed with the extension 8. To supply ground coffee through the ground coffee shaft 6 the coffee bean container 1 is brought into a position so that the opening 9 is flush with the corresponding opening of the automatic coffee maker.

Figure 3:
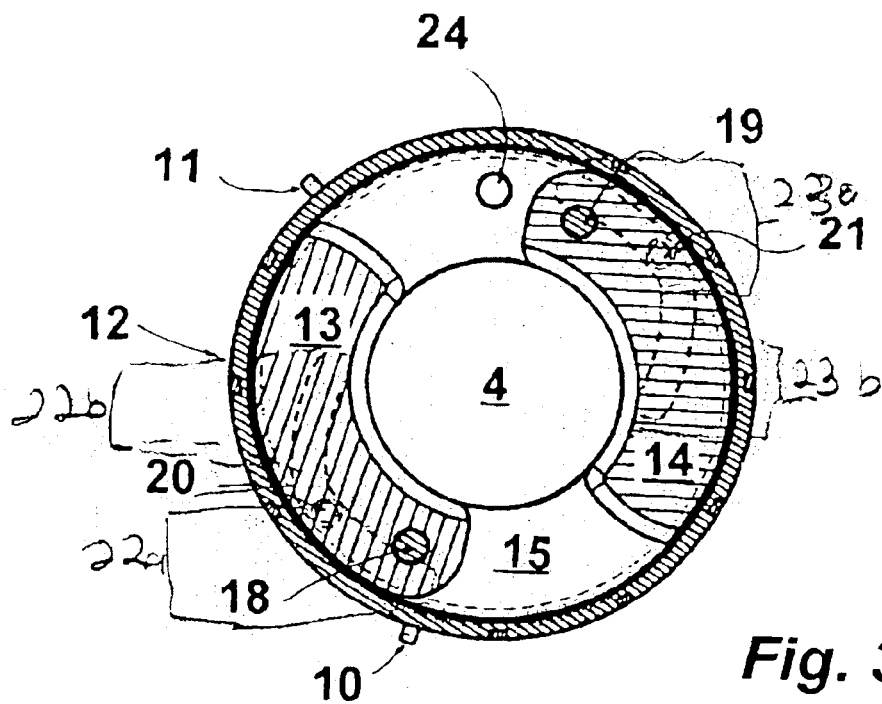
FIG. 3 is a cross sectional view along line A-B of FIG. 2 of a closure unit in the open position.
Figure 4:
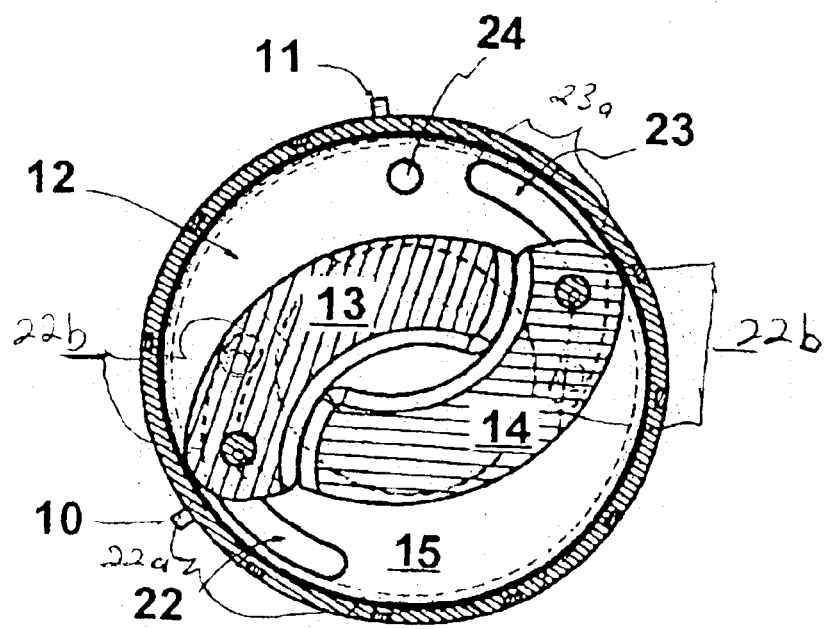
FIG. 4 is a cross sectional view along line A-b of FIG. 2 of a closure unit in the closed position.

The coupling ring 7 includes bayonet pins 10, 11, shown in FIGS. 3, 4, with which the coupling ring 7, and consequently the coffee bean container, can be secured on the automatic coffee maker.

Between the coupling ring 7 and the receptacle 2 a closure unit, denoted overall by the reference number 12, is disposed in the proximity of the output shaft 4. The closure unit 12 functions to close the output shaft 4 when the coffee bean container 1 is removed from an automatic coffee maker to prevent coffee beans contained in the receptacle 2 from falling out of the output shaft 4. The closure unit 12 includes two closure elements 13, 14 and a cam disk 15.

Figure 2:
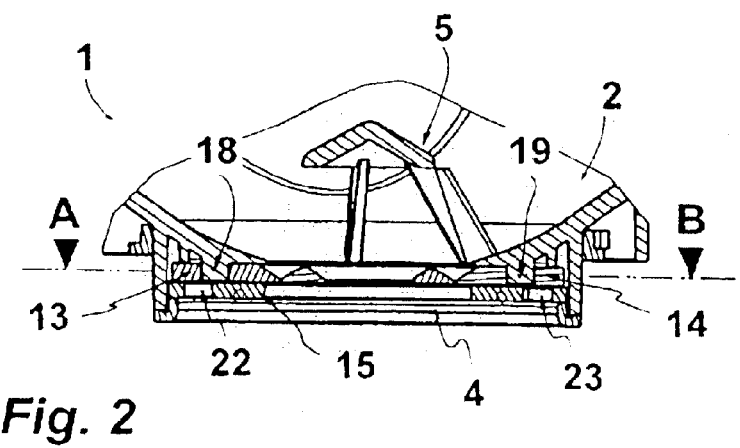
FIG. 2 is a cross sectional view through the region of the lower closure of the coffee bean container of FIG. 1.

The closure elements 13, 14 are developed in the form of an arc, and near one end have a bearing opening 16, 17. As shown in FIG. 2, bearing pegs 18 or 19 formed onto the underside of receptacle 2 engage one bearing opening 16, 17 to pivotably support the closure elements 13, 14. The pivot axes formed by the bearing pegs 18, 19 extend parallel to the axis of the output shaft 4. The closure elements 13, 14 carry one cam peg 20, 21 each on the side directed away from the receptacle 2. Each cam peg 20, 21 engages one cam groove 22, 23 of the cam disk 15. The cam disk 15 is held torsion-tight against a rotational movement of receptacle 2, and for this purpose includes a stop bore 24, which is engaged by a pin, secured stationarily on the coffee machine (not shown), when the coffee bean container 1 is placed onto an automatic coffee maker.

On the side directed toward the axis of the output shaft 4 the two closure elements 13, 14 can be beveled toward the receptacle 2, as shown the sectional representation of FIG. 2, in order to be able to more readily displace coffee beans located in front of this front side of the closure element.

FIG. 3 is a cross section of the closure unit 12 with the two closure elements 13, 14 with view directed from the receptacle 2 downward. Beneath each closure element 13 or 14 is located a cam groove 22 or 23 on cam disk 15. Also shown the disposition of the particular cam pegs 20 or 21, each of which engages a cam groove 22 or 23.

The cam grooves 22, 23 have two sections. A first outer section 22a, 23a is disposed concentrically with respect to the axis of the output shaft 4. A rotational movement of receptacle 2 or of the coupling ring 7 within a limited angle of rotation in this section 22a, 223a has no effect on an actuation of the closure unit 12. A rotational movement within this section leads to an opening or closing of the automatic coffee maker-side opening for receiving already ground coffee by moving extension 8 and hole 9, shown in FIG. 1. Next to the first section each of the two cam grooves 22, 23 has a second section 22b, 23b extending tangentially. With a rotational movement of receptacle 2 in the clockwise direction in this second section the two closure elements 13, 14, due to the described connecting link guidance, are driven to pivot into the output shaft 4 until both closure elements 13, 14 border on one another, as is shown in FIG. 4. A remaining residual opening between the two closure elements 13, 14 is sized such that the inner width of this remaining residual opening is smaller than the average diameter of the coffee beans to be contained in the receptacle 2.

The bayonet closure of the coupling ring 7 against the automatic coffee maker is structured such that the coffee bean container 1 can only be removed from the automatic coffee maker when the closure unit 12 is in the position shown in FIG. 4. Accordingly the automatic coffee maker-side guidance for the bayonet pins 10, 11 of coupling ring 7 and the disposition of the pin held on the automatic coffee for engaging the stop bore 24 is structured analogously.

A further development of such a coffee bean container provides disposing a set peg, which can be moved between the residual opening remaining between the closure elements for the removal of coffee beans. Such a set peg can be supported spring-loaded on the coffee bean container, such that in its base position it initially does not extends into the residual opening between the closed closure elements. Only if needed this set peg be moved into the position in which it engages the closure elements for pushing away possibly remaining coffee beans.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. Coffee bean container for an automatic coffee maker comprising;
    a receptacle for storing coffee beans with an output shaft via which coffee beans in the receptacle can be supplied to a grinding mill;
    a coupling ring disposed coaxially to the output shaft for connecting the coffee bean container to an automatic coffee maker;
    a closure unit comprising at least one closure element for closing the output shaft, wherein the at least one closure element is supported pivotably about a pivot axis parallel to the axis of the output shaft and movable between an open and a closed position; and
    wherein the closure unit further comprises a mechanical drive, through which the at least one closure element mechanically coupled to a rotational movement of the receptacle can be pivoted from the open position into the closed position or conversely.

2. Coffee bean container as claimed in claim 1, wherein the mechanical drive is a connecting link drive.

3. Coffee bean container as claimed in claim 2, wherein the at least one closure element is driven by a cam peg engaging a cam groove.

4. Coffee bean container as claimed in claim 3, wherein each closure element of the closure unit carries a cam peg which engages a cam groove.

5. Coffee bean container as claimed in claim 4, wherein with the closure unit is associated a cam disk with a number of cam grooves corresponding to the number of closure elements.

6. Coffee bean container as claimed in claim 5, wherein the cam disk is disposed torsion-tight with the coupling ring.

7. Coffee bean container as claimed in claim 5, wherein the receptacle is connected torsion-tight with the coupling ring and the cam disk has a stop bore, which is engaged by a pin preventing the execution of a rotational movement of the cam disk with the coffee bean container mounted on the automatic coffee maker.

8. Coffee bean container as claimed in one of claims 1 to 7, wherein at least one closure element is usefully beveled toward the receptacle on a side directed in the open position toward the output shaft.

9. Coffee bean container as claimed in one of claims 1 to 7, wherein the closure unit comprises two closure elements which are supported diametrically opposing one another to the axis of the output shaft.

10. Coffee bean container as claimed in claim 8, wherein the closure unit comprises two closure elements which are supported diametrically opposing one another to the axis of the output shaft.

* * * * *